United States Patent [19]
Yutaka

[11] Patent Number: 5,910,853
[45] Date of Patent: Jun. 8, 1999

[54] ROTARY POLYGON MIRROR OPTICAL SCANNING DEVICE

[75] Inventor: Ishizuka Yutaka, Nagano, Japan

[73] Assignee: Sankyo Seiki Mfg. Co., Ltd., Nagano-ken, Japan

[21] Appl. No.: 08/998,270

[22] Filed: Dec. 24, 1997

[30] Foreign Application Priority Data

Dec. 27, 1996 [JP] Japan .................................. 8-349913

[51] Int. Cl.⁶ .................................................. G02B 26/08
[52] U.S. Cl. ........................ 359/200; 359/198; 359/216; 359/217; 347/261; 384/114; 384/120
[58] Field of Search .................................... 359/196, 198, 359/199, 200, 216, 217, 218, 219; 384/100, 107, 112, 114, 120; 347/261

[56] References Cited

U.S. PATENT DOCUMENTS

| | | | |
|---|---|---|---|
| 5,069,515 | 12/1991 | Itami et al. | 359/200 |
| 5,142,176 | 8/1992 | Takahashi | 359/200 |
| 5,606,448 | 2/1997 | Suzuki et al. | 359/198 |
| 5,642,150 | 6/1997 | Takahashi | 347/257 |

FOREIGN PATENT DOCUMENTS 5-44717  2/1993  Japan .

*Primary Examiner*—Cassandra Spyrou
*Assistant Examiner*—Darren E. Schuberg
*Attorney, Agent, or Firm*—McAulay Nissen Goldberg Kiel & Hand, LLP

[57] ABSTRACT

A rotary polygon mirror optical scanning device comprises a fixed shaft and a rotor having a shaft hole, to which the fixed shaft is inserted, and is rotatably supported against an outer perimeter of the fixed shaft. The device also includes a hydrodynamic bearing mechanism for supporting the rotor. The hydrodynamic bearing mechanism has first and second hydrodynamic pressure generating grooves which are, axially away from one another, formed on at least one of an outer surface of the fixed shaft and an inner surface of the shaft hole of the rotor. A rotary mirror is mounted on the rotor. A motor portion is arranged for rotating the rotor. The fixed shaft has a diameter bearing which is one-third or more of a diameter of a polygonal inscribed circle of the rotary polygon mirror. An area for cutting the first hydrodynamic pressure generating groove is arranged at an axially identical position with the rotary polygon mirror.

6 Claims, 3 Drawing Sheets

(A)

rotational angle (B)

rotational angle

ROTARY POLYGON MIRROR OPTICAL SCANNING DEVICE

BACKGROUND OF THE INVENTION a) Field of the Invention

The present invention relates to a rotary polygon mirror optical scanning device having a hydrodynamic bearing motor, and more specifically, a rotary polygon mirror optical scanning device capable of rotating a rotary polygon mirror without accompanying surface vibrations.

b) Description of the Related Art

Generally, in rotary polygon mirror optical scanning devices having a hydrodynamic bearing motor, a rotary polygon mirror is mounted on one side edge of a rotor. This easily causes rotational unbalance of the rotor. When the rotor becomes out of balance in rotations causing vibrations in a shaft, the gap becomes varied in a clearance between the rotor and a fixed-side bearing portion which rotatably supports the rotor via a hydrodynamic bearing mechanism. This may cause an improper hydrodynamic pressure generating condition, which degrades bearing performance. Also, when the rotational balance of the rotor is lost, mirror surface vibrations are caused in the rotary polygon mirror mounted on the rotor. This may hinder the rotary polygon mirror from performing excellent optical scanning.

U.S. Pat. No. 5,642,150, for example, discloses a structure to prevent the rotary polygon mirror from having surface vibrations. In this structure, the axial mounting position of the rotary polygon mirror is set as high as one of the hydrodynamic pressure generating grooves which are produced at positions away from one another by a predetermined distance; the mounting position of the rotary polygon mirror which is large in inertial mass in the rotor is positioned at the hydrodynamic pressure generating portion (the portion with high bearing rigidity). Therefore, the rotary polygon mirror is not easily subjected to induced surface vibrations. Surface vibrations are also prevented from occurring by axially setting the rotational torque generating portion in the motor portion as high as the cutting area of the other hydrodynamic pressure generating groove.

In the rotary polygon mirror optical scanning device, however, the diameter of the fixed shaft is small compared to the diameter of the rotary polygon mirror. For this reason, the surface vibrations described above are still generated as far as it substantially affects optical scanning.

OBJECT AND SUMMARY OF THE INVENTION

A primary object of the present invention is to provide a rotary polygon mirror optical scanning device capable of smoothly rotating a rotary polygon mirror without accompanying surface vibrations and thereby overcome the problems of the related art described above.

In accordance with the invention, a rotary polygon mirror optical scanning device comprises a fixed shaft and a rotor having a shaft hole, to which the fixed shaft is inserted, and is rotatably supported against an outer perimeter of the fixed shaft. The device also includes a hydrodynamic bearing mechanism for supporting the rotor. The hydrodynamic bearing mechanism has first and second hydrodynamic pressure generating grooves which are, axially away from one another, formed on at least one of an outer surface of the fixed shaft and an inner surface of the shaft hole of the rotor. A rotary mirror is mounted on the rotor. A motor portion is arranged for rotating the rotor. The fixed shaft has a diameter bearing which is one-third or more of a diameter of a polygonal inscribed circle of the rotary polygon mirror. An area for cutting the first hydrodynamic pressure generating groove is arranged at an axially identical position with the rotary polygon mirror.

DESCRIPTION OF THE PREFERRED EMBODIMENTS

Figure 1:
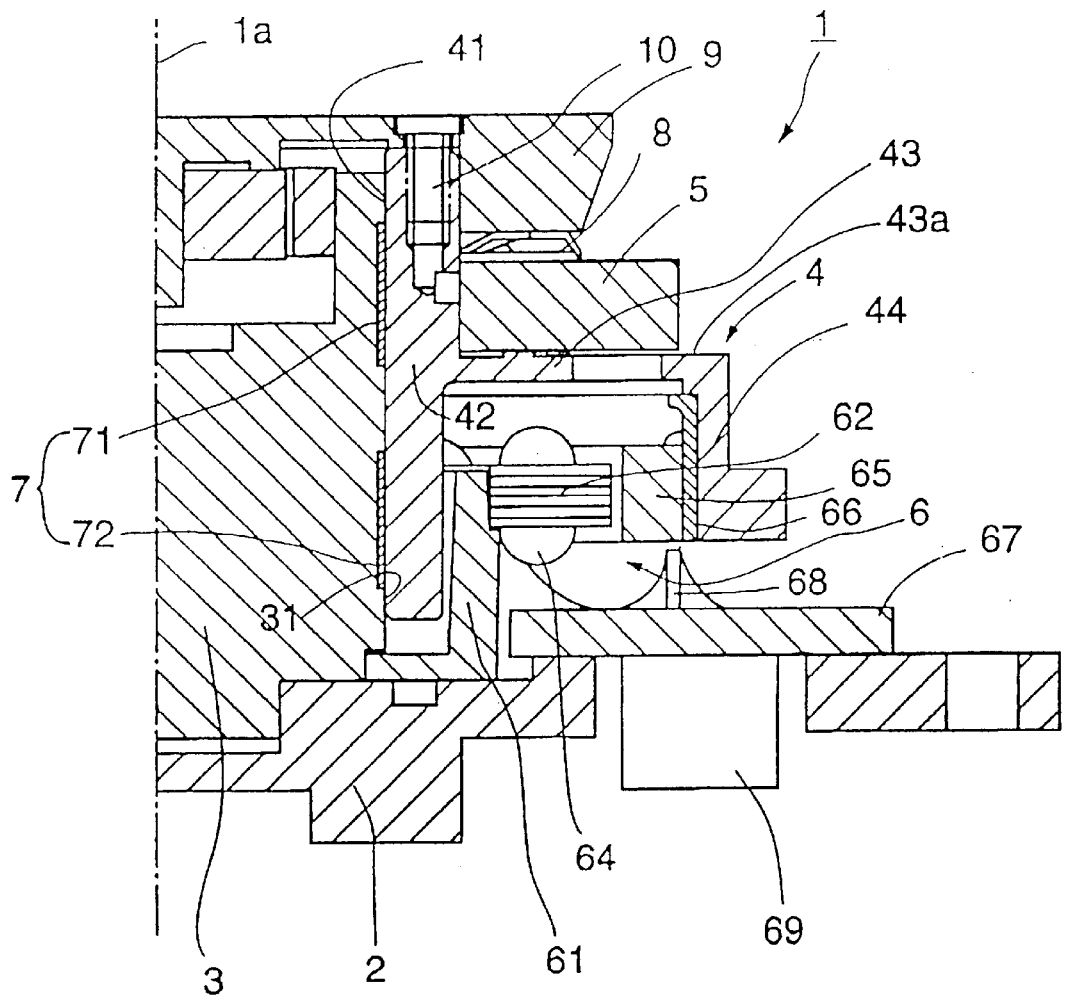
FIG. 1 is a half cross-sectional view of a rotary polygon mirror optical scanning device to which the present invention is applied.

A rotary polygon mirror optical scanning device of the present invention will be described referring to the drawings.

FIG. 1 is a half cross-sectional view of a rotary polygon mirror optical scanning device to which the present invention is applied. Referring to this figure, a rotary polygon mirror optical scanning device 1 basically comprises frame 2, a fixed shaft 3 vertically secured to the frame 2, a rotor 4 rotatably held against an outer circle of the fixed shaft 3, a rotary polygon mirror 5 mounted on the rotor 4, and a motor portion 6 for driving the rotor 4. Constituted between an outer surface 31 of the fixed shaft 3 and a shaft hole 41 bore in the rotor 4 is a hydrodynamic bearing mechanism 7 having first hydrodynamic pressure generating groove 71 and second hydrodynamic pressure generating groove 72. A minute clearance (gap) is provided between the outer surface 31 of the fixed shaft 3 and an inner surface of the shaft hole 41, and a fluid such as air is interposed therein. Also, the herringbone-shaped first and second hydrodynamic pressure generating grooves 71 and 72 are cut in the outer surface 31 of the fixed shaft 3 such that they are away from one another by a predetermined distance in the direction of axis 1a.

The rotor 4 has an cylindrical portion 42 including the shaft hole 41 inside thereof, a mirror mounting portion 43 annularly projecting outward in the radius direction from the axially center position in the outer surface of the cylindrical portion 42, and a cylindrical flange portion 44 bent perpendicularly from the outer periphery of the mirror mounting portion 43 and extended in the axis 1a direction.

The surface of the mirror mounting portion 43 is for attaching a mirror, and the rotary polygon mirror 5 is mounted thereto. The rotary polygon mirror 5 is pressed toward the mirror mounting portion 43 by a clamp member 9 via a pressing spring 8. The clamp member 9 is fastened and fixed to the upper end of the cylindrical portion 42 of the rotor 4 by a fastening bolt 10.

A core holder 61, a component of the motor portion 62, is arranged outside the outer surface of the cylindrical portion 42 of the rotor 4 and below the mirror mounting portion 43, such that it coaxially surrounds the outer circle of the cylindrical portion 42. The bottom edge of the core holder 61 is fixed to the frame 2. A stator core 62, another component of the motor portion 6, is coaxially mounted around the outer circle portion at the upper end of the core holder 61. The stator core 62 has a plurality of salient-poles around the circumference paced at constant intervals. A stator core coil 64 is wound around the salient-poles. An annular drive magnet 65 of the motor portion 6 is coaxially arranged around the outer circle of the stator core 62. The drive magnet 65 is secured to the inner surface of a magnet yoke 66 adhered to the inner surface of the flange 44 formed in the rotor 4. In this manner, the motor portion 6 of this embodiment is configured such that the stator core 62 and the drive magnet 65 are coaxially arranged. In other words, the motor portion 6 employs a structure in that a magnetic flux is formed in a radial direction.

Also, a motor circuit board 67 is placed on the surface of the frame 2 below the stator core 62 and drive magnet 65 which are the motor components. On the front and back surfaces of the motor circuit board 67, various circuit devices such as terminal 68, connector 69, etc. are mounted.

In the rotary polygon mirror optical scanning device 1 of this embodiment, the cutting areas in the direction of axis 1$a$ of the first and second hydrodynamic pressure generating grooves 71 and 72 cut in the outer surface 31 of the fixed shaft 3 are determined in the following manner.

First, the area for cutting the first hydrodynamic pressure generating groove 71 on the upper side of the fixed shaft 3 is determined in the direction of axis 1$a$ almost as high as the mounting position of the rotary polygon mirror 5 on the rotor 4. In this embodiment, the thickness dimension of the rotary polygon mirror 5 is determined such that when seen from the direction orthogonal to the axis 1$a$, it is substantially within the cutting area of the first hydrodynamic pressure generating groove 71. A desired effect can be obtained when the cutting area of the first hydrodynamic pressure generating groove 71 and the thickness dimension of the rotary polygon mirror 5 axially overlap with each other by a half or greater portions.

The area for cutting the second hydrodynamic pressure generating groove 72 is determined in the direction of axis 1$a$ substantially as high as the stator core 62 in the motor portion 6, in which the rotational torque is generated. In this embodiment, since the cutting area in the axial direction of the second hydrodynamic generating groove 72 is longer than the thickness dimension of the stator core 62, the stator core 62 is determined to be positioned in the axial direction within the cutting area of the second hydrodynamic pressure generating groove 72.

In the rotary polygon mirror optical scanning device 1 configured as above, when the motor portion 6 is driven to turn the rotor 4, a pumping action of the fluid occurs due to relative rotary movements between the first and second hydrodynamic pressure generating grooves 71 and 72 which are respectively cut in the inner surface of the shaft hole 41 and the outer surface 31 of the fixed shaft 3. The pumping action produces hydrodynamic pressure between the surfaces, and the rotor 4 rotates maintaining a predetermined clearance with respect to the fixed shaft 3.

The mounting position of the rotary polygon mirror 5 is set in the direction of the axis 1$a$ almost as high as the cutting area of the first hydrodynamic pressure generating groove 71. The mirror mounting portion on the rotor 4, which is large in inertial mass, is positioned corresponding to the hydrodynamic pressure generating portion (the portion of high bearing rigidity). In this manner, the eccentric force to cause shaft vibrations is prevented or suppressed from affecting the rotor 4 with the inertial force generated accompanying the rotations of the rotary polygon mirror 5. In addition, the clearance between the rotor 4 and fixed shaft 3 can be maintained constant, preventing unstable rotational balance of the rotor 4. Consequently, the rotary polygon mirror 5 attached to the rotor 4 can be rotated without having surface vibrations. In particular, the bearing loss is prevented by interposing air as a fluid between the inner surface of the shaft hole 41 and the first and second hydrodynamic pressure generating grooves 71 and 72 produced on the outer surface 31 of the fixed shaft 3, making it possible to rotate the rotary polygon mirror at extremely high speed.

In this embodiment, the rotational torque generating portion of the motor portion 6 is also positioned in the direction of axis 1$a$ almost as high as the cutting area of the second hydrodynamic pressure generating groove 72. Since the rotational torque generating portion is also positioned corresponding to the hydrodynamic pressure generating portion in this manner, the rotational torque is prevented or suppressed from being the eccentric force to cause shaft vibrations and affect the rotor 4. From this viewpoint, the shaft vibrations of the rotor 4 also can be effectively prevented, and therefore, the rotary polygon mirror 5 can be rotated without accompanying surface vibrations.

Figure 2:
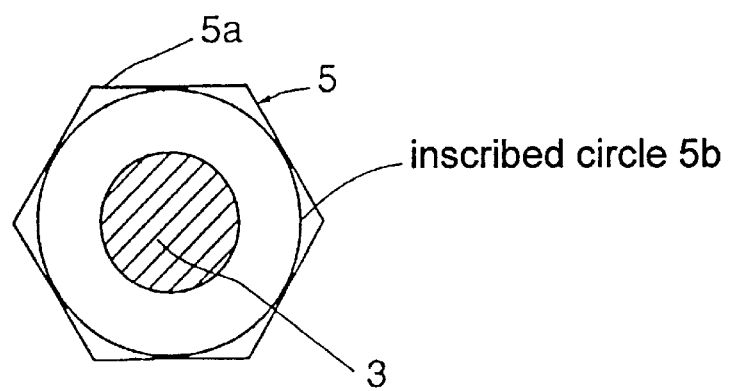
FIG. 2 is a diagram showing the dimensional relationship of the rotary polygon mirror and fixed shaft in the rotary polygon mirror optical scanning device of FIG. 1.

Next the size of the fixed shaft 3, on which the first and second hydrodynamic pressure generating grooves 71 and 72 are produced, will be described. Generally, when comparing the thick one with the conventional thin one, the thicker fixed shaft 3 has a wider outer surface, and accordingly the cutting area of the hydrodynamic pressure generating grooves is increased, increasing the bearing rigidity. This results in improving the rotational precision of the rotor 4 held against the outer surface of the fixed shaft 3. One of the parameters to measure the rotational precision is the runout precision, particularly non-repeating runout (NRRO). The inventor of the present invention takes into account the relationship between the thickness of the fixed shaft 3 and the dimension of the rotary polygon mirror 5. The inventor has found that setting the thickness of the fixed shaft 3 at least $\frac{1}{3}$ of a polygonal inscribed circle of the rotary polygon mirror 5 will constitute a hydrodynamic bearing mechanism having excellent bearing properties. In other words, as shown in FIG. 2, when an outer reflective surface of the rotary polygon mirror 5 is shaped in a regular polyhedron 5$a$, if the thickness of the fixed shaft 3 is set such that the diameter of $\frac{1}{3}$ or more of that of the polygonal inscribed circle 5$b$, excellent bearing properties can be obtained.

Figure 3:
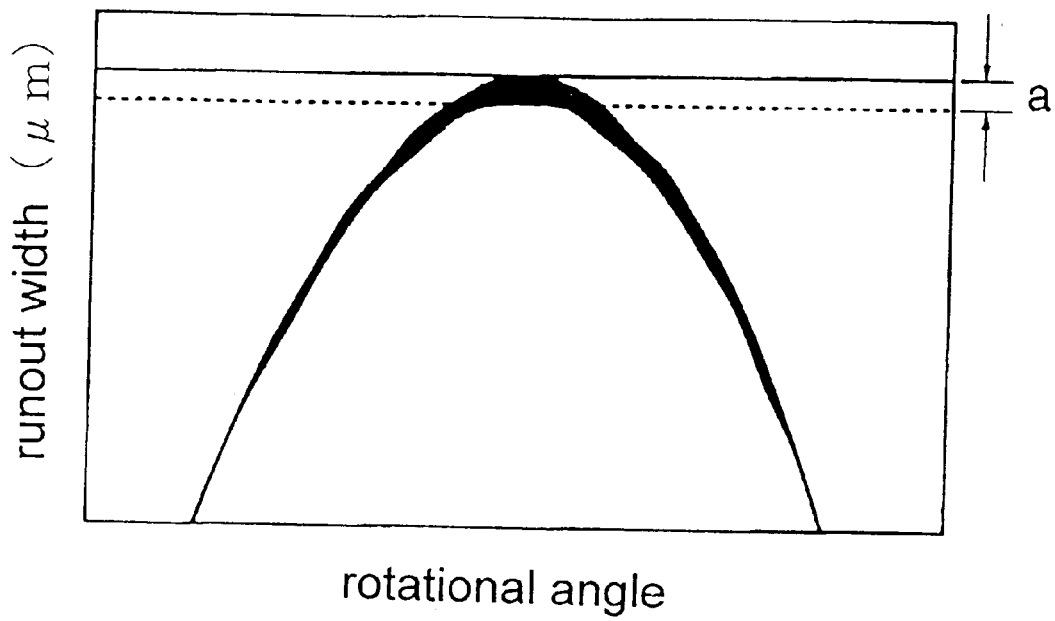
FIGS. 3(a) and 3(b) are graph showing the result of measuring non-repeating runout.
Figure 3:
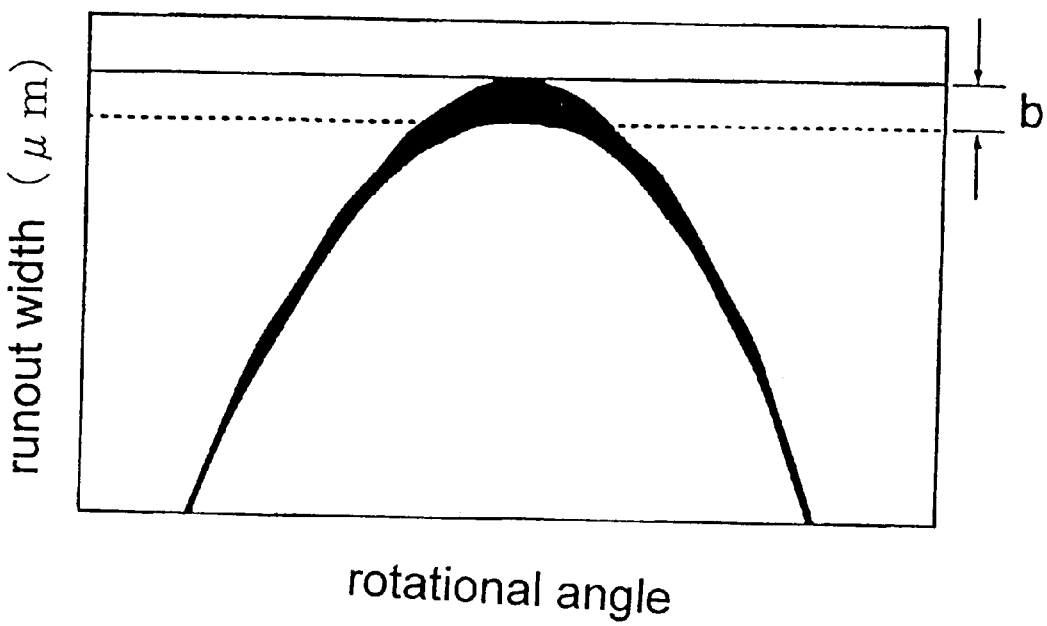

FIG. 3 shows measurement results of non-repeating runout (NRRO). FIG. 3(A) is a graph showing a measurement result of non-repeating runout when the radius of the polygonal inscribed circle 5$b$ of the rotary polygon mirror 5 is set to be 17 mm and the radius of the fixed shaft 3 to be 6.0 mm (that is, the radius of the fixed shaft is set to be $\frac{1}{3}$ or more of that of the polygonal inscribed circle of the rotary polygon mirror). As shown in this graph, the runout width (a) measured with a predetermined rotational angle is about 0.09 micron.

On the other hand, FIG. 3($b$) is a graph showing a measurement result of non-repeating runout (NRRO) when the radius of the polygonal inscribed circle 5$b$ of the rotary polygon mirror 5 is set to be 17 mm and the radius of the fixed shaft to be 3.4 mm (that is, the radius of the fixed shaft is set $\frac{1}{5}$ of that of the polygonal inscribed circle of the rotary polygon mirror). As shown in this graph, the runout magnitude (a) measured with a predetermined rotational angle is about 0.16 micron.

In general, if the runout magnitude (a) exceeds 0.1 micron, the precision in imaging by optical scanning is degraded during the rotation at high speed. According to the measurement done by the inventor and et al, it is ensured that, when the diameter of the fixed shaft 3 is set to be ⅓ or larger of the diameter of the polygonal inscribed circle 5b of the rotary polygon mirror 5, the rigidity and generated hydrodynamic pressure of the hydrodynamic bearing are increased, thus reducing the magnitude of the non-repeating runout (NRRO) to the range of practically no hindrance.

Although the material of the fixed shaft 3 has not been mentioned in particular in the above description, changes in ambient temperature may cause each portion a thermal deformation to vary the clearance between the fixed shaft 3 and rotor 4 or displace the mounting position of the rotary polygon mirror 5 on the rotor 4, for example. Such thermal deformation affects stable rotational precision. To avoid this problem, forming the rotary polygon mirror 5, fixed shaft 3, and rotor 4 of the materials having substantially the same linear thermal expansion coefficient is preferred. For example, the rotor 4 may be a die-casting product made of aluminum or zinc, and the fixed shaft 3 also may be a die-casting form or mold made of aluminum.

Figure 4:
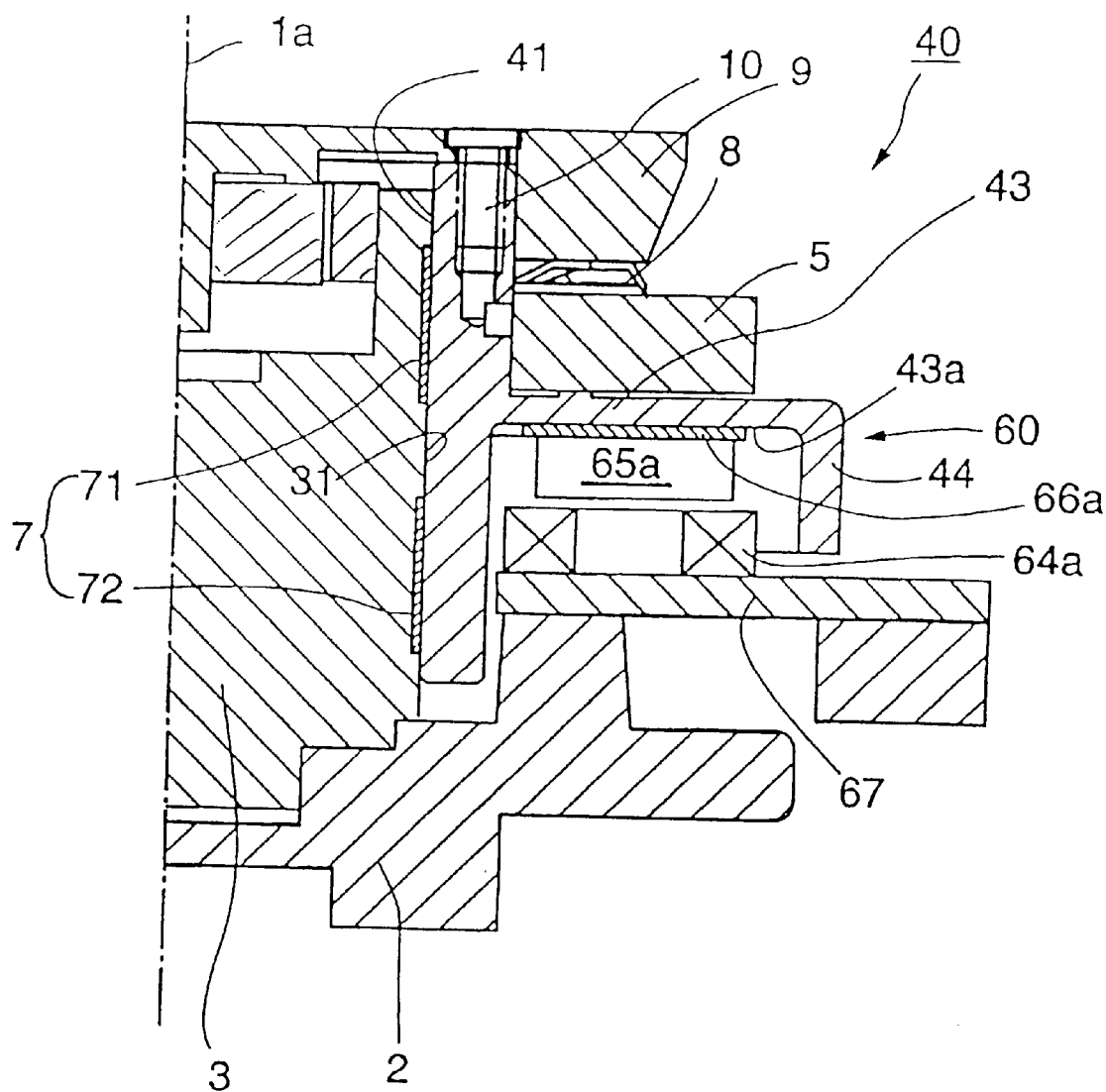
FIG. 4 is a half cross-sectional view of another example of the rotary polygon mirror optical scanning device to which the present invention is applied.

FIG. 4 shows another embodiment of a rotary polygon mirror optical scanning device to which the present invention is applied. Portions in this figure corresponding to those in FIG. 1 are coded the same and their descriptions are omitted. A rotary polygon mirror optical scanning device 40 of this embodiment employs a motor structure for the motor portion 60 in which a magnetic flux is formed in the thrust direction. This is a different aspect from the above mentioned rotary polygon mirror optical scanning device 1. Other structures remain the same as the device 1.

In other words, the motor portion 60 has an annular drive magnet 65a attached to an annular magnet yoke 66a adhered to the back surface 43a of the mirror mounting portion 43 on the rotor 4 and a stator coil 64a provided on the front surface of the motor circuit board 67. The drive magnet 65a and stator coil 64a are arranged such that they coaxially surround the outer circle of the rotor 4 and face each other in the direction of the axis 1a.

The rotary polygon mirror optical scanning device 40 employing this motor structure can also provide the same effect as the device 1 illustrated in FIG. 1.

As described above, in the rotary polygon mirror optical scanning device of the present invention, the diameter of the fixed shaft is set to be at least ⅓ of that of the polygonal inscribed circle of the rotary polygon mirror. Also, the hydrodynamic pressure generating groove cutting area is set axially as high as the mounting position of the rotary polygon mirror. Therefore, the rotary polygon mirror can be turned without surface vibrations. Accordingly the rotary polygon mirror optical scanning device having a predetermined rotational precision can be produced in a flatter shape.

Also in the present invention, the other hydrodynamic pressure generating groove cutting area is set axially as high as the rotational torque generating portion of the motor. Therefore, the rotational precision of the rotary polygon mirror can be improved, and accordingly, the rotary polygon mirror optical scanning device is easily produced in a flatter shape.

In addition, in the present invention, the rotary polygon mirror, the rotor to which the rotary polygon mirror is attached, and the fixed shaft rotatably supporting the rotor are formed of the materials having the equivalent linear thermal expansion coefficient. For this reason, degrading the rotational precision due to the thermal deformation can be prevented.

While the foregoing description and drawings represent the preferred embodiments of the present invention, it will be obvious to those skilled in the art that various changes and modifications may be made therein without departing from the true spirit and scope of the present invention.

What is claimed is:

1. A rotary polygon mirror optical scanning device comprising:

a fixed shaft;

a rotor having a shaft hole, to which said fixed shaft is inserted, and rotatably supported against an outer circular portion of said fixed shaft;

a hydrodynamic bearing mechanism for supporting said rotor, said hydrodynamic bearing mechanism having first and second hydrodynamic pressure generating grooves which are, axially away from one another, formed on at least one of an outer surface of said fixed shaft and an inner surface of said shaft hole of said rotor;

a rotary polygon mirror being mounted on said rotor;

a motor portion being arranged for rotating said rotor;

said fixed shaft having a diameter being one-third or more of a diameter of a polygonal inscribed circle of said rotary polygon mirror; and an area for cutting said first hydrodynamic pressure generating groove being arranged at an axially identical position with said rotary polygon mirror.

2. The rotary polygon mirror optical scanning device as set forth in claim 1 wherein a stator core of said motor portion is arranged at the axially identical position with said area for cutting said second hydrodynamic pressure generating groove.

3. The rotary polygon mirror optical scanning device as set forth in claim 2 wherein said fixed shaft is inserted and fitted into a cylindrical portion of said rotor; said stator core being arranged such that it coaxially surrounds an outer circle of said cylindrical portion; and a rotor magnet of said motor portion being arranged such that it coaxially surrounds an outer circumference of said stator core.

4. The rotary polygon mirror optical scanning device as set forth in claim 2 wherein said motor portion has a rotor magnet and a stator coil arranged axially opposite said rotor magnet, and said rotor magnet and said stator coil being arranged such that they both coaxially surround an outer circle of a cylinder portion of said rotor.

5. The rotary polygon mirror optical scanning device as set forth in claim 1 wherein said rotary polygon mirror, fixed shaft, and rotor are formed of materials having an equivalent linear expansion coefficient.

6. The rotary polygon mirror optical scanning device as set forth in claim 1 wherein, in said hydrodynamic bearing mechanism, air is interposed between said first and second hydrodynamic pressure generating grooves and an inner surface of said shaft hole of said rotor.

* * * * *